Patented Dec. 5, 1939

2,182,314

UNITED STATES PATENT OFFICE 2,182,314

THEOBROMINE ALKALINE EARTH METAL GLUCONATES

Russel J. Fosbinder, Short Hills, N. J., assignor to The Maltbie Chemical Company, Newark, N. J., a corporation of New Jersey No Drawing. Application June 25, 1937, Serial No. 150,328

6 Claims. (Cl. 260—253)

This invention relates to the preparation of a new compound and its use in the treatment of cardio-vascular and similar diseases.

Various compounds or drugs have been used or suggested for use in the past for the treatment of cardiac disorders. These have included certain xanthine derivatives, such as theobromine and theophylline or other salts or mixtures of these compounds or their salts with other substances. For example, theobromine sodium salicylate and theobromine sodium acetate have been used for this purpose and the relatively insoluble salt theobromine calcium salicylate has been suggested for use to increase diuretic action. However, the therapeutic efficiency of highly soluble derivatives in relation to cardiac disorders has been relatively low, making it necessary to give large dosages. In general, the administration of theobromine and theophylline compounds, including those referred to above, is accompanied by nausea, vomiting and considerable nervous distress and the administration of such compounds in doses sufficient to obtain the desired therapeutic effect in the treatment of cardiac disorders has been accompanied with excessive gastric irritation and other untoward symptoms.

It is an object of this invention to provide a compound which will have increased effectiveness in the treatment of cardiovascular and similar diseases and will also act as a diuretic in moderate dosages. It is a further object to provide such a compound which may be used for such purposes without excessive gastric irritation or other undesirable effects. Other objects will become apparent.

It has been found that nontoxic alkaline earth double salts of theobromine and gluconic acid may be used to advantage for this purpose. For example, theobromine calcium gluconate has been found to give increased effectiveness as a vasodilator and as a diuretic in moderate dosages, for example, 15 to 30 grains daily, without being accompanied by excessive gastric irritation or other undesired symptoms.

The theobromine calcium gluconate can be used alone or with other compounds or drugs useful in the treatment of cardiovascular disease. For instance, it may be used with digitalis in cases of congestive failure and with other substances, such, for example, as potassium iodide, phenobarbital and other compounds or drugs. Continued administration of theobromine calcium gluconate in effective dosages for the treatment of cardiovascular diseases may be made without causing untoward reactions, such as gastric irritation, nausea, dizziness and other related symptoms.

The following are examples of methods for the preparation of a composition embodying my invention, although it is not intended to limit the invention to the particular examples given:

Example 1

50 grams of theobromine may be dissolved in 250 cc. of an aqueous solution containing 23 grams of sodium hydroxide. 50 grams of Delta gluconolactone (anhydride of gluconic acid) in 100 cc. of water may be added. To this mixture of solutions may be added 31 grams of anhydrous calcium chloride in 100 cc. of water.

On standing a brilliant white precipitate is obtained. This precipitate may be filtered, washed and dried, preferably at a temperature below 100° C., and may be used in the treatment of cardiovascular and occlusive vascular diseases.

Example 2

50 grams of theobromine may be dissolved in a solution of 12 grams of sodium hydroxide in 125 cc. of water. To this may be added 61 grams of sodium gluconate in 100 cc. of water and to this mixture of solutions may be added 31 grams of calcium chloride (calculated as anhydrous) in 100 cc. of water. The precipitate may be filtered out, washed and dried, preferably at below 100° C. in order to avoid charring.

Example 3

50 grams of theobromine may be dissolved in 75 cc. of water containing 12 grams of sodium hydroxide. To this may be added a solution containing 16 grams of calcium chloride (as anhydrous) in 75 cc. of water. To this mixture of solutions may be added 63 grams of calcium gluconate monohydrate and 200 cc. of water. The solutions may be allowed to stand for several hours and the resulting precipitate filtered, washed and dried at a temperature under 100° C.

Example 4

50 grams of calcium theobromine and 57 grams of calcium gluconate ·H2O may be mixed. 50 cc. of water may be added to this and the mixture allowed to stand over night. The hardened mass may then be dried, preferably at a temperature below 100° C.

Example 5

4.7 grams of calcium oxide and 30 grams of theobromine and 37½ grams of calcium gluconate ·H2O may be intimately mixed and 70 cc. of water added to the mixture, the resultant paste being well mixed. This mixture will harden in about 5 minutes and may be dried over a steam bath.

The precipitate resulting from the above reactions is a double compound of calcium theobromine and calcium gluconate, having the formula $$C_7H_7N_4O_2Ca \cdot C_6H_{11}O_7$$

or $$(C_7H_7N_4O_2)_2Ca \cdot (C_6H_{11}O_7)_2Ca$$

It is a white, amorphous powder, which is slightly soluble in water, and has the following advantages in the treatment of cardiac diseases:

1. It has a high diuretic action.
2. The soluble portion is theobromine calcium gluconate, which is well tolerated upon absorption.
3. It has a high vaso-dilator action.
4. Untoward reactions and gastric disturbances are avoided when this compound is administered.
5. Prolonged absorption due to low solubility.

The theobromine calcium gluconate may be administered orally in tablets of suitable size, for example, 5 grains, to bed patients or ambulants suffering from cardiovascular diseases, such, for example, as hypertension with cardiac decompensation, coronary disease with angina pectoris, or coronary disease with cardiac decompensation. It may be administered, for example, in doses of five or ten grains three times daily.

If desired, tablets containing potassium iodide or phenobarbital may be administered. Examples of suitable tablets would be ones containing 5 grains of theobromine calcium gluconate and 1½ grains of potassium iodide; 5 grains of theobromine calcium gluconate and ¼ grain of phenobarbital.

It is, of course, apparent that the grainage of the tablets and the proportions of the various ingredients may be varied.

The above compound, with or without digitalis, may be useful in the treatment of heart failure with edema. It may also be used, with or without phenobarbital, in the treatment of arteriosclerotic form of heart disease (angina pectoris, coronary occlusion). It may also be used with or without potassium or other iodide or phenobarbital in the treatment of essential hypertension (cardiovascular renal disease).

It is obvious that many modifications may be made in the preparation and use of the above described materials and the examples given are merely illustrative of various methods that will occur to those skilled in the art. Similar methods may be followed in the preparation of other double alkaline earth or alkali metal salts of xanthine derivatives and gluconic acid useful for this purpose. For example, theobromine strontium gluconate may be produced by the reaction of one molecular equivalent of strontium chloride with one molecular equivalent of sodium theobromine and one molecular equivalent of sodium gluconate. It is obvious, of course, that the alkaline earth or alkali element used should be one that is not toxic and that does not have any undesirable effect when administered. Barium salts, for example, are not suitable because of their toxicity. The compounds referred to herein may be used to advantage in the treatment of other vascular diseases such for example as occlusive vascular disease.

The terms used in describing and claiming the invention have been used in their descriptive sense and not as terms of limitation and it is intended that all equivalents of the terms used be included within the scope of the appended claims.

I claim:

1. As a new composition of matter, theobromine calcium gluconate.
2. A composition prepared for oral administration in the treatment of vascular diseases comprising theobromine calcium gluconate.
3. A tablet for the treatment of vascular disease by oral administration containing theobromine calcium gluconate.
4. As a new composition of matter, a non-toxic alkaline earth metal double salt of theobromine and gluconic acid.
5. A composition prepared for the treatment of vascular diseases comprising a non-toxic alkaline earth metal double salt of theobromine and gluconic acid.
6. A compound prepared for the treatment of vascular diseases consisting substantially entirely of theobromine calcium gluconate.

RUSSEL J. FOSBINDER.